United States Patent
Zhou

(10) Patent No.: US 10,268,629 B1
(45) Date of Patent: Apr. 23, 2019

(54) I2C DATA COMMUNICATION SYSTEM AND METHOD

(71) Applicant: HONGFUJIN PRECISION ELECTRONICS (TIANJIN) CO., LTD., Tianjin (CN)

(72) Inventor: Xiao-Long Zhou, Tianjin (CN)

(73) Assignee: HONGFUJIN PRECISION ELECTRONICS (TIANJIN) CO., LTD., Tianjin (CN)

( * ) Notice: Subject to any disclaimer, the term of this patent is extended or adjusted under 35 U.S.C. 154(b) by 0 days.

(21) Appl. No.: 15/983,410

(22) Filed: May 18, 2018

(30) Foreign Application Priority Data

Mar. 23, 2018 (CN) .......................... 2018 1 0247857

(51) Int. Cl.
*G06F 13/42* (2006.01)

(52) U.S. Cl.
CPC .. *G06F 13/4282* (2013.01); *G06F 2213/0016* (2013.01)

(58) Field of Classification Search
CPC ............................................. G06F 2213/0016
See application file for complete search history.

(56) References Cited

U.S. PATENT DOCUMENTS

| 2007/0125853 A1* | 6/2007 | Liu | G06F 13/4291 235/439 |
| 2007/0162654 A1* | 7/2007 | Miwa | G06F 13/1673 710/35 |
| 2013/0032699 A1* | 2/2013 | Widzgowski | G01J 1/44 250/214 SW |
| 2014/0068122 A1* | 3/2014 | Shen | G06F 13/4204 710/100 |

FOREIGN PATENT DOCUMENTS

EP 2051465 A2 * 4/2009 ............ H03D 3/006

* cited by examiner

*Primary Examiner* — Farley Abad
(74) *Attorney, Agent, or Firm* — ScienBiziP, P.C.

(57) ABSTRACT

A data communication system applied in an Inter-Integrated Circuit (I2C) bus includes a complex programmable logic device (CPLD) and a communication device. The CPLD includes a signal obtaining unit, a counting unit, and a comparing unit. The signal obtaining unit obtains SDA and SCL signals of the I2C bus of the communication device, and transmits same to the counting unit. The counting unit counts the valid data of the SDA within one clock cycle of the SCL signal to get a count value, and transmits the count value to the comparing unit. The comparing unit compares the count value with a second preset value, and outputs the corresponding data in decoded form according to the result of comparison.

18 Claims, 3 Drawing Sheets

I2C DATA COMMUNICATION SYSTEM AND METHOD

FIELD

The subject matter herein generally relates to data communications.

BACKGROUND

Inter-Integrated Circuit (I2C) communications are used in server applications. I2C bus data transmission has strict timing requirements. When an I2C device in the data transmission does not meet the timing requirements, data can be mishandled.

BRIEF DESCRIPTION OF THE DRAWINGS

Implementations of the present disclosure will now be described, by way of example only, with reference to the attached figures.

DETAILED DESCRIPTION

Figure 1:
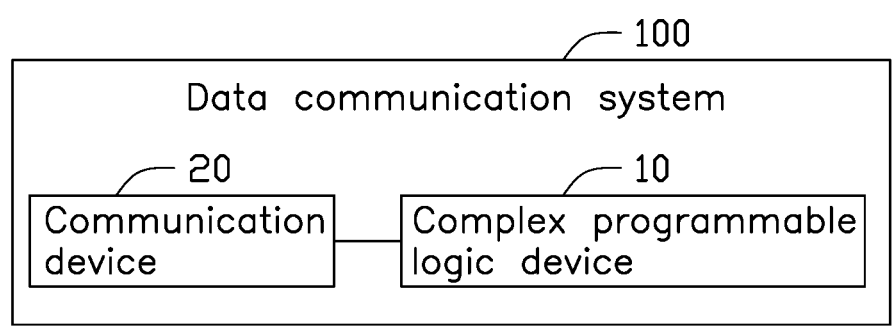
FIG. 1 is a block diagram of an exemplary embodiment of a data communication system.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "comprising" means "including, but not necessarily limited to"; it specifically indicates open-ended inclusion or membership in a so-described combination, group, series, and the like.

Figure 2:
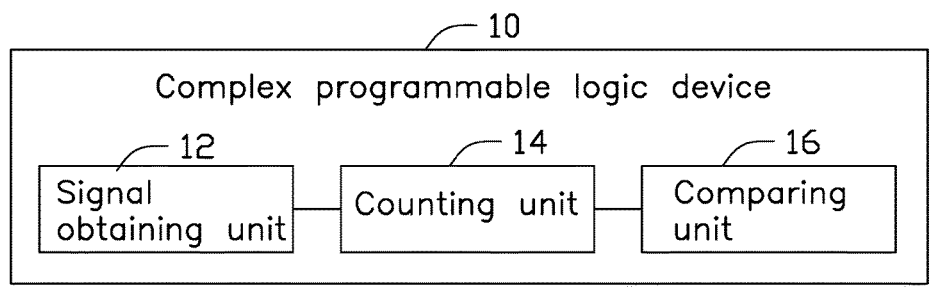
FIG. 2 is a schematic diagram of a complex programmable logic device (CPLD) of the system of FIG. 1.

FIG. 1 illustrates a data communication system 100 in accordance with an exemplary embodiment. FIG. 2 illustrates a complete programmable logic device 10 in accordance with an exemplary embodiment. The data communication system 100 comprises a complex programmable logic device (CPLD) 10 and a communication device 20. A communication connection is established between the CPLD 10 and the communication device 20 for data transmission. In this exemplary embodiment, the communication device 20 is a central processing unit (CPU).

In FIG. 2, the CPLD 10 comprises a signal obtaining unit 12, a counting unit 14, and a comparing unit 16.

In at least one exemplary embodiment, the signal obtaining unit 12 obtains the serial data (SDA) signal and the serial clock (SCL) signal of the Inter-Integrated Circuit (I2C) bus of the communication device 20, and transmits the SDA signal and the SCL signal to the counting unit 14.

The counting unit 14 obtains the SDA signal and the SCL signal. The counting unit 14 counts the valid data of the SDA signal within one clock cycle of the SCL signal to get a count value, and transmits the count value to the comparing unit 16.

In at least one exemplary embodiment, the counting unit 14 starts to count the valid data of the SDA signal when the SCL signal is at a high level (e.g., logic 1) and stops counting when the SCL signal is at a low level. In at least one exemplary embodiment, the high level is logic 1, and the low level is logic 0.

In this way, the count value of the valid data of the SDA can be obtained within one clock cycle of the SCL signal.

The counting unit 14 counts the valid data of the SDA signal in one clock cycle of the SCL signal as follows:

The counting unit 14 sets a first preset value, such as 50, and counts the valid data of the SDA signal N times within one clock cycle of the SCL signal, N being a positive integer. In this exemplary embodiment, the N is 50.

The counting unit 14 determines whether the SDA signal is at a high level (e.g., logic 1), and sequentially performs up-down counting based on the first preset value and according to the result of determination.

For example, when the counting unit 14 determines that the SDA signal is at a high level (such as logic 1) at a first count, the counting unit 14 adds 1 to the first preset value, that is, the counting value is 50+1=51. When the counting unit 14 determines that the SDA signal is at the high level at a second counting, the counting unit 14 adds 1 to the counting value after the first count, that is, the counting value is 51+1=52. When the counting unit 14 determines that the SDA signal is at the low level (such as logic 0) at a third count, the counting unit 14 subtracts 1 from the second counted value, that is, the counting value is 52−1=51.

This process continues until the counting unit 14 determines that the level of the SDA signal is at the 50th count, and thus obtains the 50th count value according to the above counting method.

In at least one exemplary embodiment, the comparing unit 16 compares the count value with a second preset value, and outputs the corresponding decoded data according to the result of comparison. In this exemplary embodiment, the second preset value is 70.

In at least one exemplary embodiment, when the count value is less than the second preset value, the comparing unit 16 outputs the decoded data as zero. Thus, the valid data of the SDA signal transmitted in one clock cycle of the SCL is zero.

In at least one exemplary embodiment, when the count value is greater than or equal to the second preset value, the comparing unit 16 outputs the decoded data as 1. Thus, the valid data of the SDA signal transmitted in one clock cycle of the SCL is 1.

In at least one exemplary embodiment, the first preset value and the second preset value may be adjusted according to actual needs.

The decoded data output by the comparing unit 16 is the real data transmitted by the communications device 20 within one clock cycle of the SCL signal.

Figure 3:
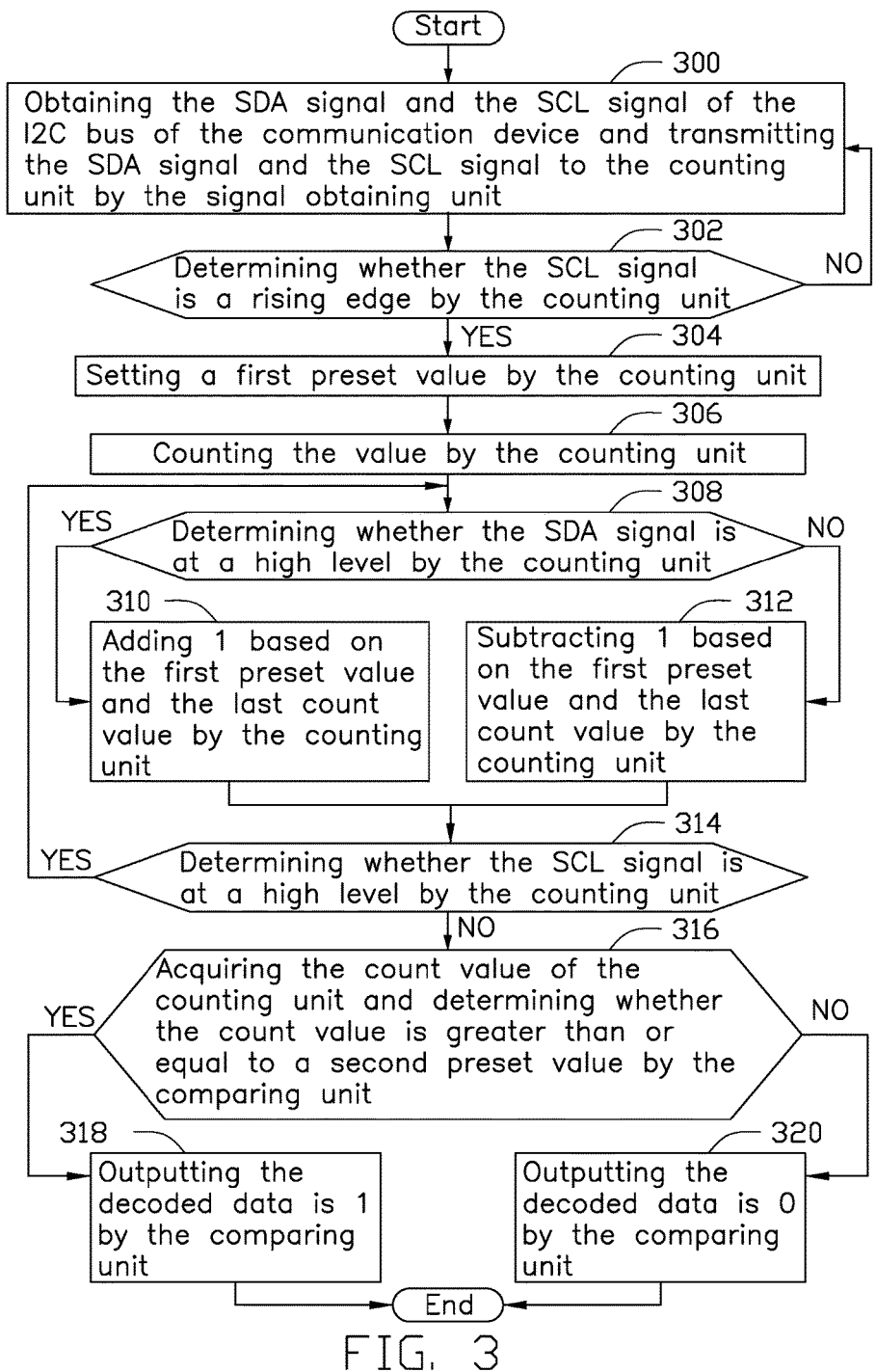
FIG. 3 is a flow diagram of an exemplary embodiment of a data communication method.

FIG. 3 is a flowchart depicting an exemplary embodiment of a data communication method. The method is provided by way of example, as there are a variety of ways to carry out the method. The exemplary method described below can be carried out using the configurations illustrated in FIGS. 1-2, for example, and various elements of these figures are referenced in explaining the example method. Each block shown in FIG. 3 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure. The example method can begin at block 300.

At block 300, the signal obtaining unit 12 obtains the SDA signal and the SCL signal of the I2C bus of the communication device 20, and transmits the SDA signal and the SCL signal to the counting unit 14.

At block 302, the counting unit 14 determines whether the SCL signal is rising to a high level. If the SCL signal is rising to the high, block 304 is implemented, otherwise returns to block 300.

At block 304, the counting unit 14 sets a first preset value. In this exemplary embodiment, the first preset value is 50. The counting unit 14 counts the valid data of the SDA signal N times within one clock cycle of the SCL signal, N being a positive integer. In this exemplary embodiment, the N is 50.

At block 306, the SCL signal is a rising edge and the counting unit 14 is activated to count.

At block 308, the counting unit 14 determines whether the SDA signal is at a high level (such as logic 1). If the SDA signal is at a high level, block 310 is implemented, otherwise block 312 is implemented.

At block 310, the counting unit 14 adds 1 based on the first preset value and the last count value.

For example, when the counting unit 14 determines that the SDA signal is at a high level (such as logic 1) at a first count, the counting unit 14 adds 1 to the first preset value, that is, the counting value will be 50+1=51. When the counting unit 14 determines that the SDA signal is at the high level at a second counting, the counting unit 14 adds 1 to the counting value after the first count, that is, the counting value will be 51+1=52.

At block 312, the counting unit 14 subtracts 1 based on the first preset value and the last count value.

For example, when the counting unit 14 determines that the SDA signal is at the low level (such as logic 0) at a third count, the counting unit 14 subtracts 1 from the second counted value, that is, the counting value will be 52−1=51.

At block 314, the counting unit 14 determines whether the SCL signal is at a high level. If the SCL signal is at a high level, such as 1, the process returns to block 308, otherwise block 316 is implemented.

At block 316, the comparing unit 16 acquires the count value of the counting unit 14 and determines whether the count value is greater than or equal to a second preset value. If the count value is greater than or equal to a second preset value, block 318 is implemented, otherwise block 320 is implemented.

At block 318, the comparing unit 16 outputs the decoded data as 1. Thus, the valid data of the SDA signal transmitted in one clock cycle of the SCL is 1.

At block 320, the comparing unit 16 outputs the decoded data as zero. Thus, the valid data of the SDA signal transmitted in one clock cycle of the SCL is zero.

Thus, the decoded data output by the comparing unit 16 is the real data transmitted by the communications device 20 within one clock cycle of the SCL signal. In this way, when any distortion occurs in the SDA signal, the valid data of the SDA signal may be repaired in time by the counting unit 14 and the comparison unit 16, to obtain real data in decoded form, so as to ensure stability.

The exemplary embodiments shown and described above are only examples. Many details are often found in the art such as the other features of data communication system and method. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A data communication method comprising:
obtaining SDA signal and SCL signal of a Inter-Integrated Circuit (I2C) bus of a communication device;
counting valid data of the SDA signal within one clock cycle of the SCL signal to get a count value; and
comparing the count value with a first preset value and outputting a corresponding decoded data according to the comparison result.

2. The data communication method of claim 1, wherein further comprising:
counting the valid data of the SDA signal when the SCL signal is at a high level; and
stopping count of the valid data of the SDA signal when the SCL signal is at a low level.

3. The data communication method of claim 2, wherein further comprising:
setting a second preset value and counting the valid data of the SDA signal N times within one clock cycle of the SCL signal, where N is a positive integer; and
determining whether the SDA signal is at a high level and performing up-down count based on the second preset value and according to the determination result.

4. The data communication method of claim 3, wherein further comprising:
outputting the decoded data as 1 when the count value is greater than or equal to the first preset value.

5. The data communication method of claim 4, wherein further comprising:
outputting the decoded data as 0 when the count value is less than the first preset value.

6. A data communication system, comprising:
a signal obtaining unit obtaining SDA signal and SCL signal of a Inter-Integrated Circuit (I2C) bus of a communication device;
a counting unit counting valid data of the SDA signal within one clock cycle of the SCL signal to get a count value; and
a comparing unit comparing the count value with a first preset value and outputting a corresponding decoded data according to the comparison result.

7. The data communication system of claim 6, wherein the counting unit counts the valid data of the SDA signal when the SCL signal is at a high level.

8. The data communication system of claim 7, wherein the counting unit stops count of the valid data of the SDA signal when the SCL signal is at a low level.

9. The data communication system of claim 8, wherein the counting unit sets a second preset value and counts the valid data of the SDA signal N times within one clock cycle of the SCL signal, and N is a positive integer.

10. The data communication system of claim 9, wherein the counting unit determines whether the SDA signal is at a high level and performs up-down count based on the second preset value according to the determination result.

11. The data communication system of claim 10, wherein the comparing unit outputs the decoded data as 1 when the count value is greater than or equal to the first preset value.

12. The data communication system of claim 11, wherein the comparing unit outputs the decoded data as 0 when the count value is less than the first preset value.

13. A data communication system, comprising:
   a signal obtaining unit obtaining SDA signal and SCL signal of a Inter-Integrated Circuit (I2C) bus of a communication device;
   a counting unit counting valid data of the SDA signal within one clock cycle of the SCL signal to get a count value; and
   a comparing unit comparing the count value with a first preset value and outputting a corresponding decoded data according to the comparison result;
   wherein the counting unit counts the valid data of the SDA signal when the SCL signal is at a high level, and stops count the valid data of the SDA signal when the SCL signal is at a low level.

14. The data communication system of claim 13, wherein the counting unit sets a second preset value and counts the valid data of the SDA signal N times within one clock cycle of the SCL signal, and N is a positive integer.

15. The data communication system of claim 14, wherein N is 50, the first preset value is 70, and the second preset value is 50.

16. The data communication system of claim 14, wherein the counting unit determines whether the SDA signal is at a high level and performs up-down count based on the second preset value according to the determination result.

17. The data communication system of claim 16, wherein the comparing unit outputs the decoded data as 1 when the count value is greater than or equal to the first preset value.

18. The data communication system of claim 17, wherein the comparing unit outputs the decoded data 0 when the count value is less than the first preset value.

* * * * *